INVENTOR
WILLIAM J. URELL
BY
HP Terry
ATTORNEY

INVENTOR
WILLIAM J. URELL
BY
H P Terry
ATTORNEY

INVENTOR
WILLIAM J. URELL
BY
HP Terry
ATTORNEY

United States Patent Office 3,562,675

Patented Feb. 9, 1971

3,562,675

AUTOMATIC TUNED INTERFERENCE SIGNAL REJECTION FILTER INCLUDING DRIFT COMPENSATION MEANS

William J. Urell, Norwalk, Conn., assignor to Sperry Rand Corporation, a corporation of Delaware Filed May 16, 1969, Ser. No. 825,363
Int. Cl. H03g 5/28

U.S. Cl. 333—17 19 Claims

ABSTRACT OF THE DISCLOSURE

An automatic tuning filter apparatus for rejecting an interference signal applied thereto including a bridged-T network having a frequency response characteristic such that it provides narrow band rejection at a first output terminal and narrow band pass at a second output terminal, the relative phase of the interference signals at the respective output terminals being determined according to whether the filter is tuned above or below the frequency of the interference signal. A phase detector responsive to the output signals drives an integrator to produce a control signal for adjusting the capacitance of varactor diodes incorporated in the filter so as to tune the filter to the interference frequency.

BACKGROUND OF THE INVENTION

The present invention relates to automatic tuning narrow band rejection filters for suppressing interference signals. Interference sometimes presents a problem of serious proportions particularly in those instances where a plurality of systems are allocated to essentially the same frequency band. The nature of the remedial action to be taken to minimize interference depends, of course, upon the characteristics of the system to be protected. In a system having a comparatively large bandwidth, a small portion of the frequency spectrum of a desired information signal can be rejected along with a narrow band interference signal without unduly distorting the desired signal. This mode of operation is suitable, for example, in a loran navigational communication system which has a bandwidth of about 25 kHz. centered at a frequency of 100 kHz. with susceptibility to interfering signals extending from 70 kHz. to 130 kHz.

Heretofore attempts to eliminate narrow band interference in loran receivers have been accomplished with manually tuned narrow band (notch) filters comprising passive components and also with automatic tuning active filters utilizing coherent demodulation. The active filters include a control circuit comprising frequency and phase detection circuits which sample the RF input signal and adjust the reference frequency of the filter demodulators to be equal to the frequency of the interference signal. An automatic gain control mechanism incorporated in the control circuit precludes the production of harmonics to assure proper operation of the frequency and phase detectors. Tuning control provided in this manner, is open loop, however, in the sense that the adjusting signal is derived from the filter input rather than it output, that is, the residual output of the filter is not sensed. This constitutes an open loop rejection of the signal insofar as the filter output is concerned.

SUMMARY OF THE INVENTION

The present invention features closed loop control of an automatic tuning narrow band rejection filter by the provision of a bridged-T filter network supplying output signals having a distinctive phase relationship which enables a control signal to be derived therefrom for tuning the filter, the relative phase of the output signals being dependent on the frequency of the interference signal compared to the tuned frequency of the filter. The phase relationship of the output signals is detected by a phase detector which drives an integrator to produce the control signal. The control signal in turn adjusts the capacitance of varactor diodes included in the bridged-T filter in a manner to tune the filter to the frequency of the signal which is to be rejected.

A drift actuated scan circuit coupled to the integrator and phase detector provides for continuous scanning of the filter through a predetermined frequency range in the absence of a signal being applied at the filter input thereby precluding the filter from tuning to a frequency beyond the predetermined range and simultaneously enhancing the likelihood of detecting small interference signals.

DESCRIPTION OF THE PREFERRED EMBODIMENT

Figure 1:
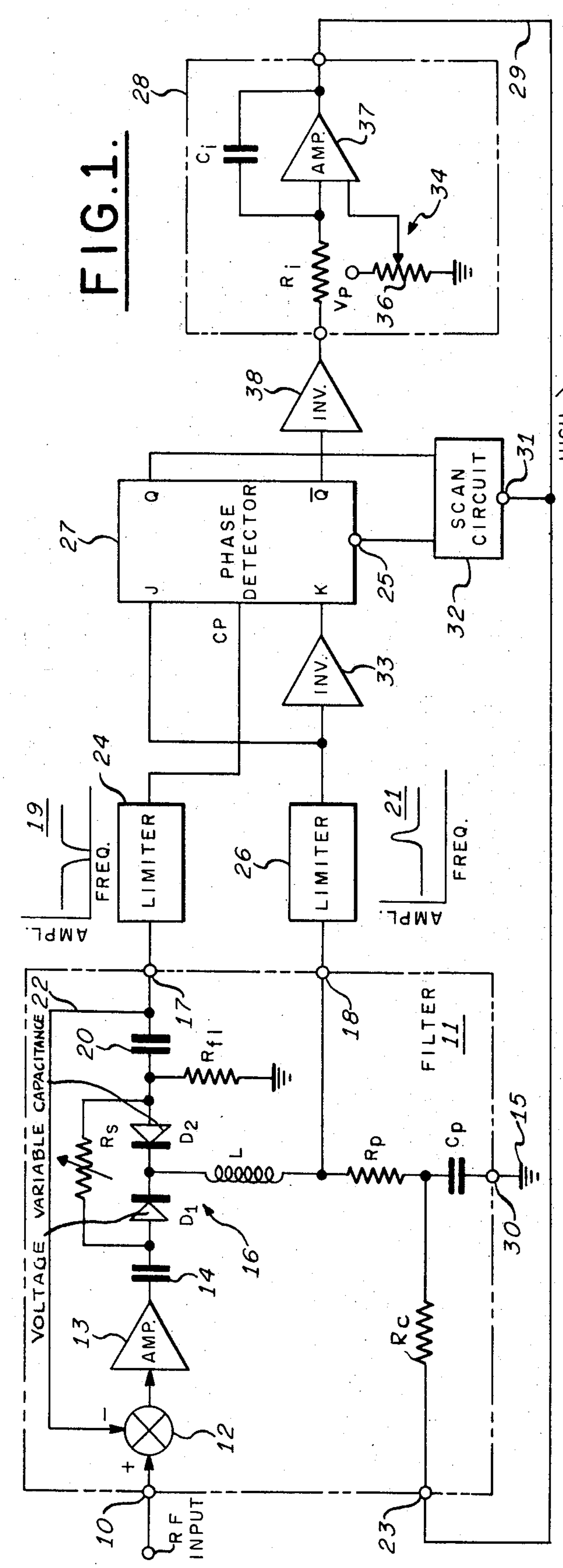
FIG. 1 is a block diagram in partial schematic form of a preferred embodiment of the automatic tuned rejection filter.

Referring to FIG. 1, an RF signal applied to input terminal 10 of filter 11 is coupled through summing device 12, amplifier 13 and coupling capacitor 14 to bridged-T network 16 comprising variable resistor $R_s$ connected in parallel with series varactor diodes $D_1$ and $D_2$ having inductor L connected from the junction therebetween in series with resistor $R_p$ and capacitor $C_p$ connected to common terminal 30 joined to ground 15. A first output terminal 17 connects through coupling capacitor 20 to the junction of resistor $R_s$ and diode $D_2$ and a second output terminal 18 connects to the junction of inductor L and resistor $R_p$. The filter has a frequency response characteristic such that it provides narrow band rejection at output terminal 17, as indicated by response characteristic 19, and narrow bandpass at output terminal 18 as indicated by response characteristic 21. Lead 22 joining output terminal 17 to mixer 12 forms a feedback path around the bridged-T network so that both good rejection and high quality factor are obtained at output terminal 17, the width of the rejection band being inversely proportional to the gain of amplifier 13 and approximately 3.5 kHz. at the half power points.

The rejection and passbands are centered on approximately the same frequency and move in unison throughout a predetermined frequency range in response to a control signal applied to filter terminal 23 connected through resistor $R_c$ to the junction of resistor $R_p$ and capacitor $C_p$. The control signal is a D.C. voltage which varies the capacitance of the voltage variable diodes $D_1$ and $D_2$. It can be ascertained from an analysis of an equivalent circuit, obtained by converting that portion of the bridged-T network comprising variable resistor $R_s$ and varactor diodes $D_1$ and $D_2$, a pi network, to an equivalent T network, that the amount of displacement between the bands is very small when the product of resistor $R_s$ and the capacitance of the varactor diodes is much less than unity. The rejection and passbands can be made to center on the same frequency over a narrow frequency band by placing a coil (not shown) in series with each varactor diode to resonate therewith. Moreover, it can be shown that theoretically infinite rejection of the interference signal is obtained in the narrow rejection band at output terminal 17 when resistor $R_S$ is adjusted to be equal to four times the resistance of $R_p$. Further, under these conditions, the interference signals at the respective output terminals are phase displaced by 90° relative to one another when the filter is not tuned to the frequency of the interference signal. More specifically, the phase of the rejected signal at output terminal 17 will lag or lead a signal of the same frequency at output terminal 18 accordingly as the filter is tuned above or below the frequency of the interference signal. As an additional refinement, the resistance of $R_p$ is made considerably larger, say ten times, than the inherent resistance of inductor L to minimze the frequency dependency of the network quality factor.

It should be understood that an individual filter is capable of rejecting only the interference signal to which it is tuned. Consequently, if two or more interfering signals having discrete frequencies are present simultaneously, a corresponding number of cascaded filters will be needed to reject all the interfering signals. The above-described phase characteristics of the signals in the rejection and passbands relate to the particular narrow band interference signal that each filter is rejecting.

Operation of the bridged-T network in a closed loop automatic tuning apparatus is accomplished by means of limiters 24 and 26, phase detector 27 and integrator 28 which has its output terminal connected by lead 29 to filter control terminal 23 and input terminal 31 of drift actuated scan circuit 32. The limiters comprise conventional amplifier and diode circuits for shaping the filter output RF signals into square waves for application to the phase detector which is a conventional J–K flip-flop. Filter band rejection output terminal 17 is coupled through limiter 24 to the flip-flop clock pulse (CP) terminal. Bandpass output terminal 18 is coupled through limiter 26 directly to the J steering terminal of the flip-flop and through inverter 33 to the K steering terminal. The flip-flop and limiters can, of course, be replaced with conventional linear circuits. The pulse type circuits are preferred, however, because of their reduced complexity and ease of operation.

Figure 2A:
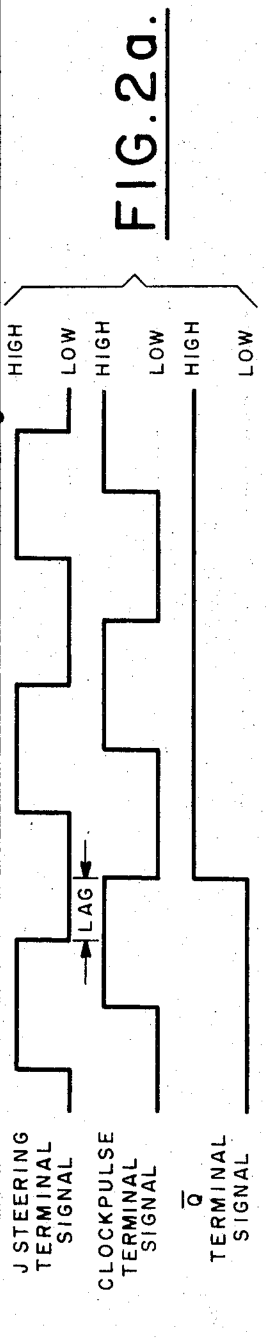
FIGS. 2*a* and 2*b* illustrate waveforms supplied to and provided by the phase detector shown in FIG. 1.

When the filter is tuned to the frequency of the interfering signal which is to be rejected, the signal at band rejection output terminal 17 is reduced to background noise as a result of the interference being rejected. At the same time, the interference at bandpass output terminal 18 is very nearly maximized. These conditions cause flip-flop phase detector 27 to change state randomly under the influence of the noise applied to its clock pulse terminal. Hence, the flip-flop output will have a duty cycle of 50% with the voltage at its $\overline{Q}$ output terminal switching alternately between approximately 0 volts and $V_p$ volts for an average (or D.C.) voltage of $V_p/2$. Biasing means 34 consisting of potentiometer 36 connected between voltage source $V_p$ and ground 15 is adjusted to minimize the output drift of the integrator operational amplifier 37 under these conditions. On the other hand, when the filter is tuned to a frequency lower than the frequency of the interference signal, the interference will not be attenuated to any great extent and may be represented, after passing through limiter 24 by the square wave J-terminal input signal depicted in FIG. 2*a*. The K-terminal input signal is, of course, inverted with respect to that of the J-terminal and as previously explained the clock pulse signal lags that at the J-terminal by 90°. For these voltage conditions at its input terminals, the flip-flop provides high level voltage at its $\overline{Q}$ output terminal. As a result, the $\overline{Q}$ terminal, coupled through inverter 38 presents a low level signal at the integrator input whereupon the control signal applied to filter terminal 23 increases in a substantially linear fashion at a rate determined by the values of resistor $R_I$ and capacitor $C_I$ connected to operational amplifier 37. Since the control signal varies at a slow rate, it is blocked by capacitor $C_p$ and applied to the varactor diodes, the current path being from the control terminal through the diodes and resistor $R_{FL}$ into ground. The resulting increased back bias on the varactor diodes causes their depletion layer capacitance to decrease and thereby tune the filter to a higher frequency. This action continues until the filter is tuned to the frequency of the interference signal and thereafter the tuned frequency tends to dither slightly about the interference frequency.

Figure 2B:
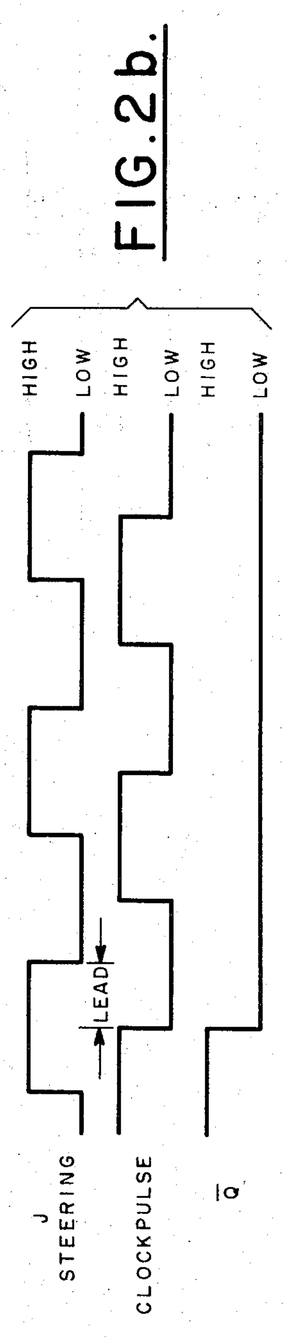

If the filter is initially tuned higher than the interference frequency, the apparatus operates in the same manner except that the phase of the steering and clock pulse signals is reversed as indicated in FIG. 2*b* with the result that the integrator output decreases causing the capacitance of the varactor diodes to increase and thereby lower the tuned frequency of the filter.

Figures 3, 4:
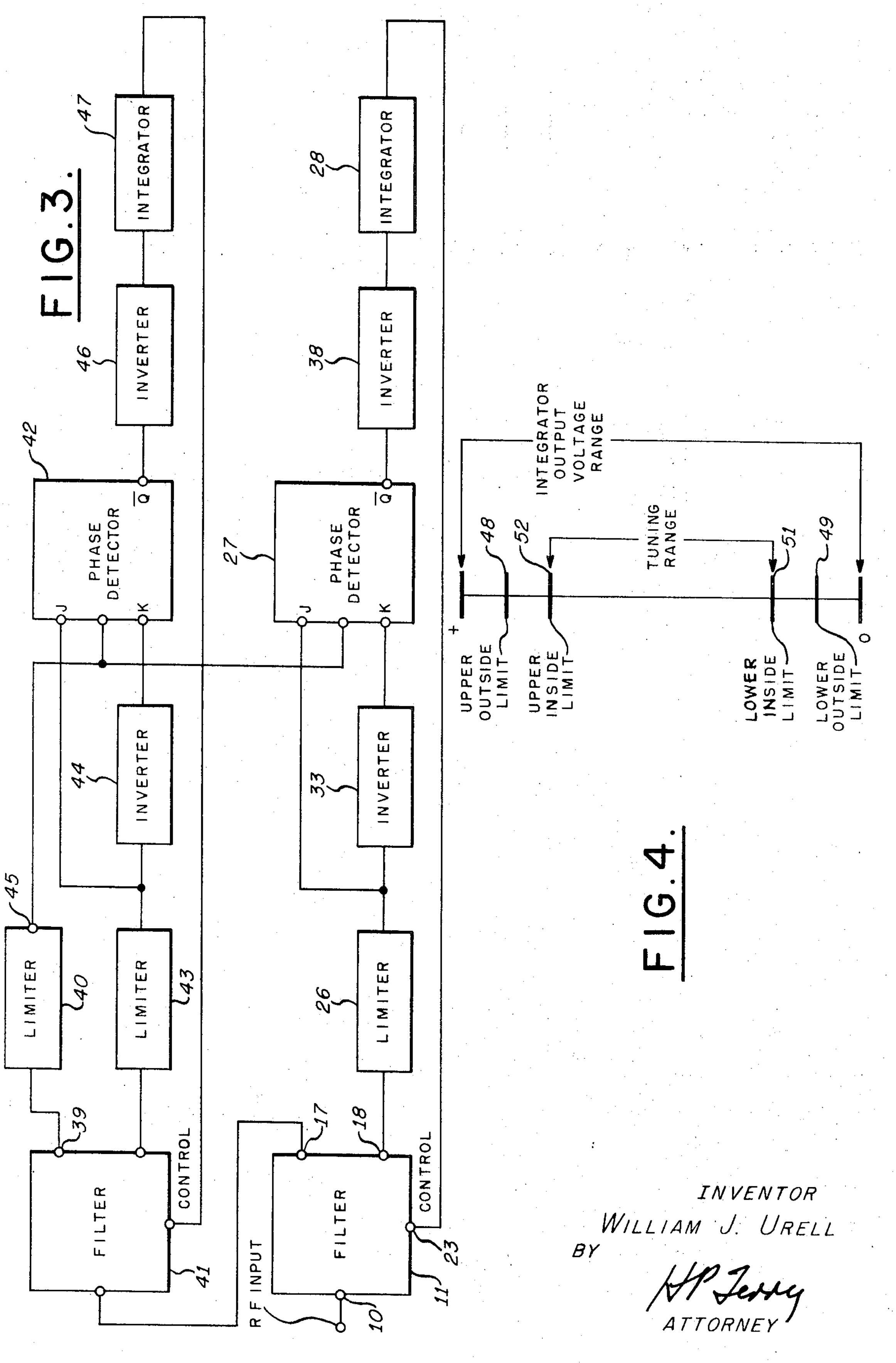
FIG. 3 is a block diagram of two serially connected filters of the type shown in FIG. 1.
FIG. 4 depicts the sensing thresholds of the scan circuit shown in FIG. 1.

It should now be apparent that if an interference signal having a frequency of say 90 kHz. is present at the input to the filter along with a desired information signal, for example, a loran pulse, then once the filter has been tuned to the interference frequency, the signal at rejection band output terminal 17 will include the frequency spectrum of the information signal excluding those components located in the rejection band, plus a remnant of the interference signal. As previously mentioned, with two or more discrete interference signals present, a plurality of serially connected filters can be utilized, each filter operating to reject one of the interference signals. It is preferable, however, where a plurality of filters are used to interconnect them as shown in FIG. 3 where the rejection band output signal at terminal 39 of filter 41 supplies clock pulses through limiter 40 for *both* phase detector 27 associated with filter 11 and phase detector 42 associated with filter 41. The limiter 26, inverters 33 and 38 and integrator 28 are interconnected with filter 11 and phase detector 27 exactly as shown in FIG. 1. Likewise, limiter 43, inverters 44 and 46 and integrator 47 are interconnected with filter 41 and phase detector 42 in the same manner. Thus, once each filter has been tuned to the frequency of the interference signal which it is rejecting, the signal at rejection band output terminal 39 of filter 41 will contain only remnants of each interference signal plus the desired information signal.

An alternate configuration could utilize a separate wide band limiter at output terminal 17 of filter 11 for the purpose of supplying a separate clock pulse input to the phase detector 27. The primary disadvantage of such a configuration is that the second interference signal, the interference signal which is rejected by the second filter (filter 41) is always present along with the remnant of the first interference signal at the clock pulse input terminal of phase detector 27. In addition, increased cost is incurred by the use of an additional limiter.

Operation of the configuration depicted in FIG. 3 is as follows. Assume that two interference signals are present at input terminal 10 of filter 11. Both filter 11 and filter 41 attempt initially to tune to the larger of the two interference signals because of suppression effects on the smaller of the interference signals inherent in amplitude limiters 26 and 43. Once either of the filters has tuned to the larger interference signal, it is effectively removed from the clock pulse (CP) terminals of phase detectors 27 and 42 so that only the smaller interference signal remains. The other filter is now free to tune to the remaining interference signal. In the event that more than two interference signals are present, the other filter will tune to the largest remaining interference signal. The use of the limiters and narrow band output characteristics of the filters as previously described for processing the signals account for the highly desirable characteristic of the filters being able to tune automatically to the two largest interference signals in a multi-interference environment.

Figure 5:
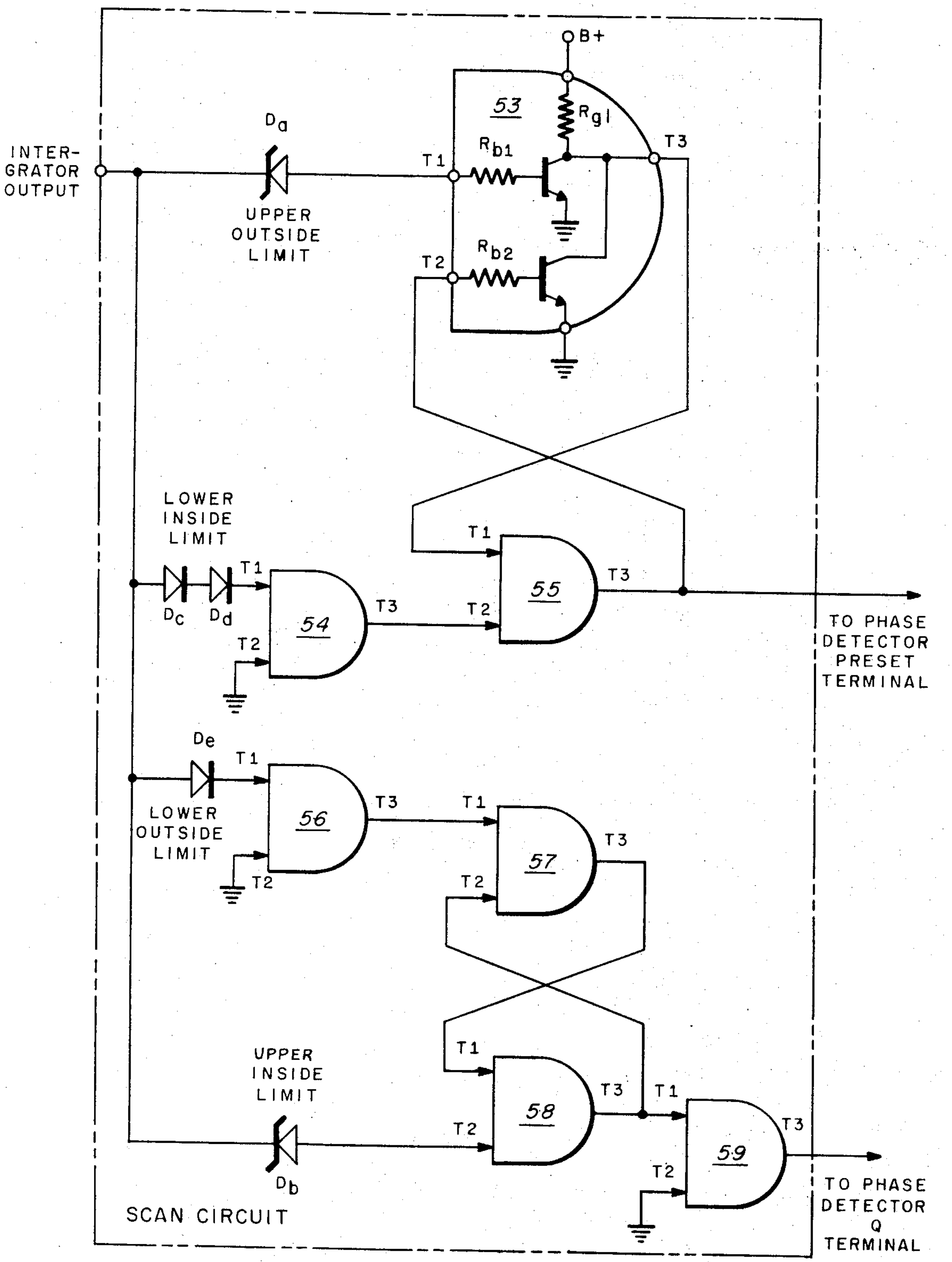
FIG. 5 is a schematic drawing of the scan circuit.

The matter of integrator drift and means for dealing with this problem will now be discussed with reference to FIGS. 4 and 5. It is well known that an electronic integrator of the type shown in FIG. 1 tends to drift in the absence of a signal being applied to its input terminal and, in general, the drift continues in a given direction once it has commenced. Consequently, if circuit unbalances are large enough, and interference signals weak enough, the integrator output eventually settles at one or the other of its extreme limits. However, if the filter was tuned close to the weak interference, a control signal of sufficient amplitude would be available to tune the filter to the interference and properly reject it. This problem is compensated for by drift actuated scan circuit 32 disposed in feedback relation between the phase detector and integrator. The scan circuit becomes operative when the integrator output reaches predetermined limits 48 and 49. For example, if the integrator output voltage is drifting to a high level, upon reaching the upper outside limit 48, a preset signal is applied to the phase detector preset terminal 25 causing it to provide at its $\overline{Q}$ output terminal a voltage of appropriate polarity to drive the integrator in the opposite direction until it reaches lower inside limit 51 whereupon the preset signal is removed from the phase detector and the integrator is free to drift once again to the upper outside limit. In the process, if the filter comes under the influence of a weak interference signal, it will respond thereto and properly reject it. Conversely, if the integrator initially drifts to the lower outside limit 49, the scan circuit will operate to drive it to the upper inside limit 52 and then permit it to drift back to the lower limit. The scan circuit comprises a plurality of two input NAND gates 53, 54, 55, 56, 57, 58 and 59, each of which includes two npn transistors having their respective base terminals connected through resistors $R_{b1}$ and $R_{b2}$ to input terminals T1 and T2. The emitter terminals of each transistor connect to ground and the collector terminals are joined together at output terminals T3 and connected through a common load resistor $R_{GL}$ to voltage supply $B^+$. The voltage at the output terminal T3 of the NAND gate is high only when the voltages applied to both input terminals are low. For all other combinations of input voltages the output voltage is low. Gate 59 is operated somewhat differently from the others in that its load resistor is not connected to the $B^+$ supply but is left open ended, the collector supply for this gate being obtained through a load resistor connected to the Q output terminal of phase detector 27.

To obtain an understanding of the operation of the scan circuit assume that the integrator output voltage has drifted to upper outside limit 48. At that instant, Zener diode $D_a$, which determines the upper outside limit, will begin to conduct. In addition, Zener diode $D_b$, which determines the upper inside limit, will also be conducting as will diodes $D_c$ and $D_d$ which determine the lower inside limit and diode $D_e$ which determines the lower outside limit. Under these conditions, the voltage at terminal T1 of gate 53 is high driving the voltage at T3 low. At the same time, the voltage at T3 of gate 54 is low. Hence, the voltages at both T1 and T2 of gate 55 are low causing the voltage at T3 thereof to be high. T3 of gate 55 in turn connects to preset terminal 25 of phase detector 27 causing the voltage at its $\overline{Q}$ terminal to switch to a low level whereupon the integrator output voltage begins decreasing. During this interval when diodes $D_a$ through $D_e$ are conducting, a high voltage appears at T3 of gate 59 connected to the Q output terminal of the phase detector. When the integrator output has decreased to the point where diode $D_a$ stops conducting but the other diodes continue conducting, the voltage at T3 of gate 55 remains high by virtue of holding the voltage at T3 of gate 53 at a low level and thereby maintains the high voltage on the preset terminal of the phase detector so that the integrator output voltage continues to decrease. When the integrator output voltage reaches inside lower limit 51, the voltage at T3 of gate 54 switches to a high level and drives the voltage at T3 of gate 55 to a low level. This removes the preset voltage from the phase detector causing the voltage at its $\overline{Q}$ terminal to be determined by the signals present at its clock pulse J and K steering terminals whereupon the integrator output voltage is no longer driven toward a lower level and thus becomes free to drift back to the upper limit, the direction of the original drift.

On the other hand, if the integrator output initially drifts to lower outside limit 49, the scan circuit operates to drive the integrator output to upper inside limit 52. In this instance, when the integrator output voltages reach the lower outside limit diode $D_e$ stops conducting. Then, the voltage at T3 of gate 56 switches to a high level. This causes the voltage at T3 of gate 57 to switch to a low level and that at T3 of gate 58 to switch to a high level since diode $D_b$ also is not conducting at this time. In turn, the voltage at T3 of gate 59 assumes a low level and thereby switches phase detector 27 such that the voltage at the $\overline{Q}$ output terminal becomes high. As a result, the integrator output voltage increases until it reaches the upper inside limit determined by diode $D_b$. Then the voltage at T3 of gate 58 switches to a low level and the voltage at the $\overline{Q}$ terminal of the phase detector is again determined by the signals appearing at its clock pulse and J and K steering terminals.

Operation of the scan circuit in the foregoing manner therefore causes the tuned frequency of filter 11 either to drift or be driven through a predetermined frequency range in the absence of a large signal being applied at its input terminal. Consequently, the probability of detecting an interference signal of small amplitude is enhanced.

While the invention has been described in its preferred embodiment, it is to be understood that the words which have been used are words of description rather than limitation and that changes may be made without departing from the true scope and spirit of the invention in its broader aspects.

I claim:

1. An automatic tuning apparatus for rejecting a narrow band interference signal comprising a filter having an input terminal coupled to receive an input signal and first and second output terminals for providing respective output signals, said filter having a frequency response characteristic such that it provides narrow band rejection at the first output terminal and narrow bandpass at the second output terminal, the rejection and passbands being centered on approximately the same frequency and tunable in unison over a substantially wide frequency range, and the phase of the interference signal which is being rejected at the first output terminal being related to the phase of the corresponding signal at the second output terminal in accordance with the frequency of the interference signal compared to the tuned frequency of the filter, means for determining the relative phase of the output signals and providing a control signal representative thereof, means for coupling the control signal to a control terminal of the filter, and means in said filter responsive to the control signal for tuning the filter to the frequency of the interference signal.

2. The apparatus of claim 1 wherein the filter is arranged and constructed such that the first output signal respectively leads and lags the second output signal accordingly as the filter is tuned above and below the frequency of the interference signal.

3. The apparatus of claim 1 wherein the phase determining and control signal producing means includes a phase detector coupled to receive the first and second output signals from said filter and provide a drive signal for application to an integrator which operates to produce said control signal.

4. The apparatus of claim 3 wherein the phase detector is a bistable circuit having first and second steering input terminals and a clock pulse input terminal, first and second amplitude limiter circuits, and an inverter, the first output terminal of said filter being coupled through the first limiter circuit to the clock pulse terminal and the second output terminal of said filter being coupled through the second limiter circuit to the first steering terminal and through both the second limiter circuit and the inverter to the second steering terminal.

5. The apparatus of claim 4 wherein the control signal responsive means comprises at least two voltage variable capacitors constituting a part of said filter.

6. The apparatus of claim 1 wherein the filter further includes a common terminal such that the input signal is applied across the input and common terminals and the output signals are obtained at the respective output terminals with reference to the common terminal.

7. The apparatus of claim 6 wherein the filter comprises a bridged-T network including a first resistor in parallel with two serially connected voltage variable capacitors disposed between the input terminal and the first output terminal and an inductor element connected from the junction of the voltage variable capacitors in series with a second resistor and a capacitor element connected to the common terminal, the second output terminal being connected to the junction between the inductor and the second resistor and the control signal being coupled to a terminal connected to the junction of the second resistor and the capacitor.

8. The apparatus of claim 7 further including a first coupling capacitor disposed between the input terminal and one end of the first resistor, a second coupling capacitor connected between the first output terminal and the other end of the first resistor, and an additional resistor connected from the junction of the first resistor and second coupling capacitor to the common terminal.

9. The apparatus of claim 8 further including summing and amplifying means connected in series between the input terminal and the first coupling capacitor, and means connecting the first output terminal to the summing and amplifying means.

10. The apparatus of claim 9 wherein the resistance of the second resistor is equal to one-fourth the resistance of the first resistor.

11. The apparatus of claim 10 wherein the resistance of the second resistor is at least ten times greater than the inherent resistance of the inductor.

12. The apparatus of claim 11 wherein the phase determining and control signal producing means includes a phase detector coupled to receive the first and second output signals from said filter and provide a drive signal for application to an integrator which operates to produce said control signal, said phase detector being a bistable circuit having first and second steering input terminals and a clock pulse input terminal, first and second amplitude limiter circuits and an inverter, the first output terminal of said filter being coupled through the first limiter circuit to the clock pulse terminal and the second output terminal of said filter being coupled through the second limiter circuit to the first steering terminal and through both the second limiter circuit and the inverter to the second steering terminal.

13. The apparatus of claim 1 and further including a drift actuated scan circuit connected to operate in conjunction with the phase determining and control signal producing means for sensing a condition whereat the control signal has drifted to either one of two predetermined limits and thereupon actuate the phase determining and control signal producing means to drive the control signal toward the other of the two predetermined limits.

14. The apparatus of claim 13 wherein the scan control circuit includes first, second, third and fourth limit detection means coupled to the phase determining and control signal producing means and representing respectively upper outside, upper inside, lower inside and lower outside limits, the scan circuit being operative when the control signal reaches the upper outside limit to drive the control signal to the lower inside limit and conversely when the control signal reaches the lower outside limit to drive it to the upper inside limit.

15. The apparatus of claim 14 wherein the scan circuit comprises a plurality of two input NAND gates which provide a high output voltage when the signals at both input terminals are low and a low output voltage for all other combinations of signals at the input terminals, the upper outside limit means being coupled to one input terminal of a first NAND gate and the lower inside limit means being coupled to one output terminal of a second NAND gate which has its other input terminal connected to ground and its output terminal connected to one input terminal of a third NAND gate having its other input terminal coupled to the output terminal of the first NAND gate and its output terminal coupled to both the other input terminal of the first NAND gate and a preset terminal on the phase determining and control signal producing means; the lower outside limit means being coupled to one input terminal of a fourth NAND gate which has its other input terminal connected to ground and its output terminal connected to one input terminal of a fifth NAND gate and upper inside limit means being coupled to one input terminal of a sixth NAND gate which has its other input terminal coupled to the output terminal of the fifth NAND gate and its output terminal connected to both the other input terminal of the fifth NAND gate and to one input terminal of a seventh NAND gate which has its other input terminal connected to ground and its output terminal connected to an output terminal of a phase detector in the phase determining and controlling signal producing means.

16. The apparatus of claim 15 wherein the upper outside and upper inside limit means are Zener diodes, the lower outside limit is a conventional diode and the lower inside limit is a pair of series connected conventional diodes.

17. An automatic tuning apparatus for rejecting narrow band interference signals comprising a plurality of filters each having an input terminal and first and second output terminals for providing respective output terminals, each filter having a frequency response characteristic such that it provides narrow band rejection at the first output terminal and narrow bandpass at the second output terminal, the rejection and passbands being centered on approximately the same frequency and tunable in unison over a substantially wider frequency range and the relative phase of the respective output signals of each filter being determined by the tuned frequency of each filter compared to the frequency of the interference signal which it is operating to reject at its first output terminal, a plurality of phase detectors each operating in conjunction with an individual filter and arranged such that the second output terminal of each filter is connected to an input terminal of its associated phase detector, means for connecting the filters in tandem such that the first output terminal of each filter connects to the input terminal of the succeeding filter and the first output terminal of the last filter couples to another input terminal of each of the phase detectors which operate to provide at their respective output terminals a control signal representative of the relative phase of the signals applied to their input terminals, means for coupling the output terminal of each phase detector to a control terminal of its related filter, and means in each of the filters responsive to the respective control signals for tuning the associate filter to a discrete interference frequency, whereby the signal at the first output terminal of the last filter contains desired information plus a small remnant of each of the interference signals applied to the input terminal of the first filter.

18. The apparatus of claim 17 wherein each coupling means includes an integrator connected between the phase detector output terminal and the filter control terminal.

19. The apparatus of claim 18 further including a plurality of drift actuated scan circuits each connected to operate in conjunction with a corresponding phase detector and integrator for sensing a condition whereat the integrator output signal has drifted to either one of two predetermined limits and thereupon actuate the phase detector to drive the integrator output signal toward the other of the two predetermined limits.

References Cited

R. Bakis, Formant Tracking, IBM Technical Disclosure Bulletin, vol. 5, No. 1, June 1962.

ELI LIEBERMAN, Primary Examiner

P. L. GENSLER, Assistant Examiner

U.S. Cl. X.R.

307—215, 233; 328—167; 333—75, 76